United States Patent
Dinh

(10) Patent No.: US 9,702,453 B2
(45) Date of Patent: Jul. 11, 2017

(54) SYSTEM AND METHOD FOR AUTOMATICALLY SHIFTING A VEHICLE

(71) Applicant: Lam Dinh, Titusville, FL (US)

(72) Inventor: Lam Dinh, Titusville, FL (US)

( * ) Notice: Subject to any disclaimer, the term of this patent is extended or adjusted under 35 U.S.C. 154(b) by 0 days.

(21) Appl. No.: 15/281,838

(22) Filed: Sep. 30, 2016

(65) Prior Publication Data

US 2017/0089454 A1    Mar. 30, 2017

Related U.S. Application Data

(60) Provisional application No. 62/234,769, filed on Sep. 30, 2015.

(51) Int. Cl.
| | |
|---|---|
| *F16H 59/66* | (2006.01) |
| *F16H 59/48* | (2006.01) |
| *F16H 59/50* | (2006.01) |
| *F16H 59/24* | (2006.01) |
| *F16H 59/68* | (2006.01) |

(52) U.S. Cl.
CPC ............ *F16H 59/48* (2013.01); *F16H 59/24* (2013.01); *F16H 59/50* (2013.01); *F16H 59/66* (2013.01); *F16H 2059/663* (2013.01); *F16H 2059/6823* (2013.01)

(58) Field of Classification Search
None
See application file for complete search history.

(56) References Cited

U.S. PATENT DOCUMENTS

| | | | |
|---|---|---|---|
| 5,393,277 A | 2/1995 | White et al. | |
| 5,401,223 A | 3/1995 | White et al. | |
| 5,979,582 A | 11/1999 | Håkansson et al. | |
| 7,225,073 B2 | 5/2007 | Hedman et al. | |
| 2011/0218720 A1* | 9/2011 | Arai | F16H 61/16 701/55 |
| 2013/0179002 A1* | 7/2013 | Tohta | F16H 59/48 701/1 |
| 2013/0245912 A1 | 9/2013 | Boot | |
| 2015/0184743 A1* | 7/2015 | Eto | F16H 61/16 701/55 |

* cited by examiner

*Primary Examiner* — Justin Holmes
(74) *Attorney, Agent, or Firm* — Global Intellectual Property Agency, LLC; Daniel Boudwin

(57) ABSTRACT

A system and method for automatically shifting a vehicle based upon monitored conditions. The system includes a sensor assembly configured to detect a tilt of the vehicle, an acceleration sensor configured to detect whether the vehicle is accelerating, and a throttle sensor configured to detect whether the throttle is activated. The system further includes a computer configured to automatically shift the transmission of the vehicle to neutral when all of the monitored conditions are satisfied. In one embodiment, if one of the conditions ceases to be satisfied, then the logic causes the transmission of the vehicle to shift back from neutral to the prior gear.

16 Claims, 3 Drawing Sheets

SYSTEM AND METHOD FOR AUTOMATICALLY SHIFTING A VEHICLE

CROSS REFERENCE TO RELATED APPLICATIONS

This application claims the benefit of U.S. Provisional Application No. 62/234,769 filed on Sep. 30, 2015. The above identified patent application is herein incorporated by reference in its entirety to provide continuity of disclosure.

BACKGROUND OF THE INVENTION

The present invention relates to automobile shifting systems. More specifically, the present invention relates to systems that automatically shift the vehicle based upon detected changes in the state of the vehicle.

Engineers are constantly seeking to improve the fuel efficiency of automobiles and other such vehicles in order limit their carbon footprint. When the transmission of an automobile is in neutral, the automobile does not expend or expends only a relatively small amount of gasoline. Therefore, it would be advantageous for the transmission system of an automobile to shift into neutral without requiring any action by the driver when the vehicle is travelling in conditions wherein shifting the vehicle into neutral does not otherwise alter the performance and function of the vehicle. For example, if the vehicle is accelerating downhill without the user actively accelerating the vehicle, then the vehicle could continue to travel downhill under the force of gravity with the transmission in neutral and without requiring the vehicle to expend any additional gasoline.

SUMMARY OF THE INVENTION

In view of the foregoing disadvantages inherent in the known types of shifting systems now present in the prior art, the present invention provides a system and method for automatically shifting a vehicle based upon various conditions detected by a sensor assembly. The system includes a sensor assembly, which includes a tilt sensor configured to detect an orientation angle of the vehicle, an acceleration sensor configured to detect an acceleration of the vehicle, and a throttle sensor configured to detect a state of a throttle of the vehicle. The system further includes a computer embodying a logic that, when executed at least in part by a processor, causes the system to detect the orientation angle of the vehicle, detect the acceleration of the vehicle, and detect the state of the throttle of the vehicle via the sensor assembly. If all of the conditions monitored by the sensor assembly are satisfied, then the logic causes the transmission of the vehicle to shift to neutral. In one embodiment, the system further monitors the state of the vehicle via the sensor assembly and if one of the conditions ceases to be satisfied, then the logic causes the transmission of the vehicle to shift back from neutral to the prior gear.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
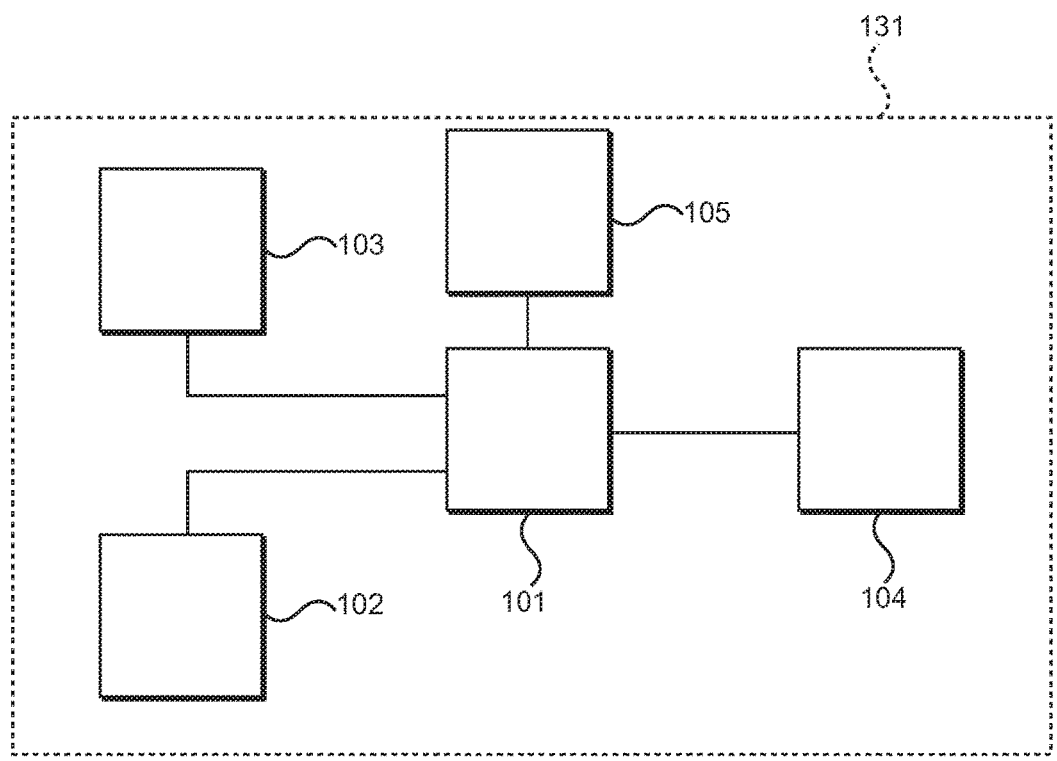
FIG. 1 shows a diagram of a system for automatically shifting a vehicle to and from neutral.

Reference is made herein to the attached drawings. Like reference numerals are used throughout the drawings to depict like or similar elements of the XXX. The figures are intended for representative purposes only and should not be considered to be limiting in any respect.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

Referring now to FIG. 1, there is shown a diagram of a system for automatically shifting a vehicle to and from neutral. The system includes a computer 101 that is operably connected to a sensor assembly. The sensor assembly includes a tilt sensor 102, an acceleration sensor 103, and a throttle sensor 104 within a vehicle 131, e.g., an automobile. The computer 101 embodies a logic, which is stored, e.g., on a non-transitory computer readable medium, and executed at least in part by a processor. As used herein, "logic" refers to (i) logic implemented as computer instructions and/or data within one or more computer processes and/or (ii) logic implemented in electronic circuitry. The computer 101 is further operably connected to the transmission 105 of the vehicle 131 such that the computer 101 can cause the transmission 105 to switch gears, e.g., between drive and neutral, via transmitting electronic commands.

The computer 101 monitors various variables associated with the operation of the vehicle 131 via the sensor assembly. When appropriate conditions are detected by the computer 101 via data received from the sensor assembly, the computer 101 is configured to shift the transmission 105 of the vehicle 131 from the gear in which the transmission 105 currently is in, e.g., drive, to neutral. When the computer 101 detects via data or signals received from the sensor assembly that one or more of the monitored conditions are no longer satisfied, then the computer 101 is configured to shift the transmission 105 of the vehicle 131 from neutral back to the prior gear. In an illustrative embodiment of the system, the system shifts the transmission 105 of the vehicle 131 to neutral when the vehicle 131 is coasting down an incline and then shifts the transmission 105 back to drive when the vehicle is no longer coasting down an incline. Shifting the vehicle 131 to neutral when travelling down an incline when the driver is not actively accelerating the vehicle 131 serves to conserve gasoline.

The tilt sensor 102 is configured to detect the orientation of the vehicle 131 with respect to a horizontal reference plane, i.e., to detect whether the vehicle is directed upwardly or downwardly. If the vehicle 131 is oriented at an angle below the horizontal plane, then it is oriented downwardly. Likewise, if the vehicle 131 is oriented at an angle above the horizontal plane, then it is oriented upwardly. The tilt sensor 102 includes a tiltmeter or another such device. The tilt sensor 102 can be integral to the vehicle 131, e.g., integrated directly from the frame of the vehicle 131, or affixed as an after-market modification to the vehicle 131.

The acceleration sensor 103 is configured to detect whether the vehicle 131 is decelerating, maintaining speed, or accelerating. In one embodiment, the acceleration sensor 103 is the on-board, integral speed detection system of the vehicle 131 that has then operably connected to the computer 101 of the present system. The on-board speed detection system of an automobile includes a rotation sensor or sensor assembly disposed on a transmission of a vehicle, which then relays information pertaining to the number of rotations of the transmission to the on-board computer of the vehicle, which is then translated to the speedometer in a form viewable by the driver. In another embodiment, the acceleration sensor 103 is a sensor, e.g., an accelerometer, configured to detect whether the vehicle 131 is accelerating that is distinct and operates separately from the integral speed detection system of the vehicle. The acceleration sensor 103 can be integral to the vehicle or affixed as an after-market modification to the vehicle 131.

The throttle sensor 104 is configured to detect the state of the throttle of the vehicle 131, i.e., whether the throttle is activated or deactivated. When the throttle of the vehicle 131 is activated, the driver has, e.g., actuated the throttle pedal in order to cause the vehicle 131 to increase in speed. In one embodiment, the throttle sensor 104 is a sensor that mechanically monitors the position of the throttle pedal (accelerometer) to determine whether the throttle is activated. In another embodiment, the throttle sensor 104 is a sensor operably connected to an electronic throttle control system of the vehicle 131 in order to monitor the state of the electronic throttle control system and thereby monitor whether the throttle of the vehicle is activated. In yet another embodiment, the throttle sensor 131 is a throttle position sensor configured to directly monitor the position of the throttle. In this embodiment, the throttle position sensor can either be the integral throttle position sensor of an electronic throttle control system or a distinct throttle position sensor operating independently therefrom.

In an illustrative embodiment, the sensor assembly in combination detects whether the vehicle 131 is oriented downwardly, i.e., whether the front end of the vehicle is lower than the back end, whether the vehicle 131 is accelerating, and whether the driver is manually accelerating the vehicle 131. In this embodiment, the sensor assembly detects whether the vehicle 131 is accelerating because it would disadvantageous for the vehicle 131 to shift into neutral when the driver desired to slow down when proceeding down an incline or was stopped or parked on an incline. In this embodiment, the sensor assembly further detects whether the driver is manually accelerating because it would disadvantageous for the vehicle 131 to shift into neutral when the driver desired to further accelerate down an incline beyond the natural acceleration of the vehicle 131 down an incline when coasting as dictated by gravity.

Figure 2A:
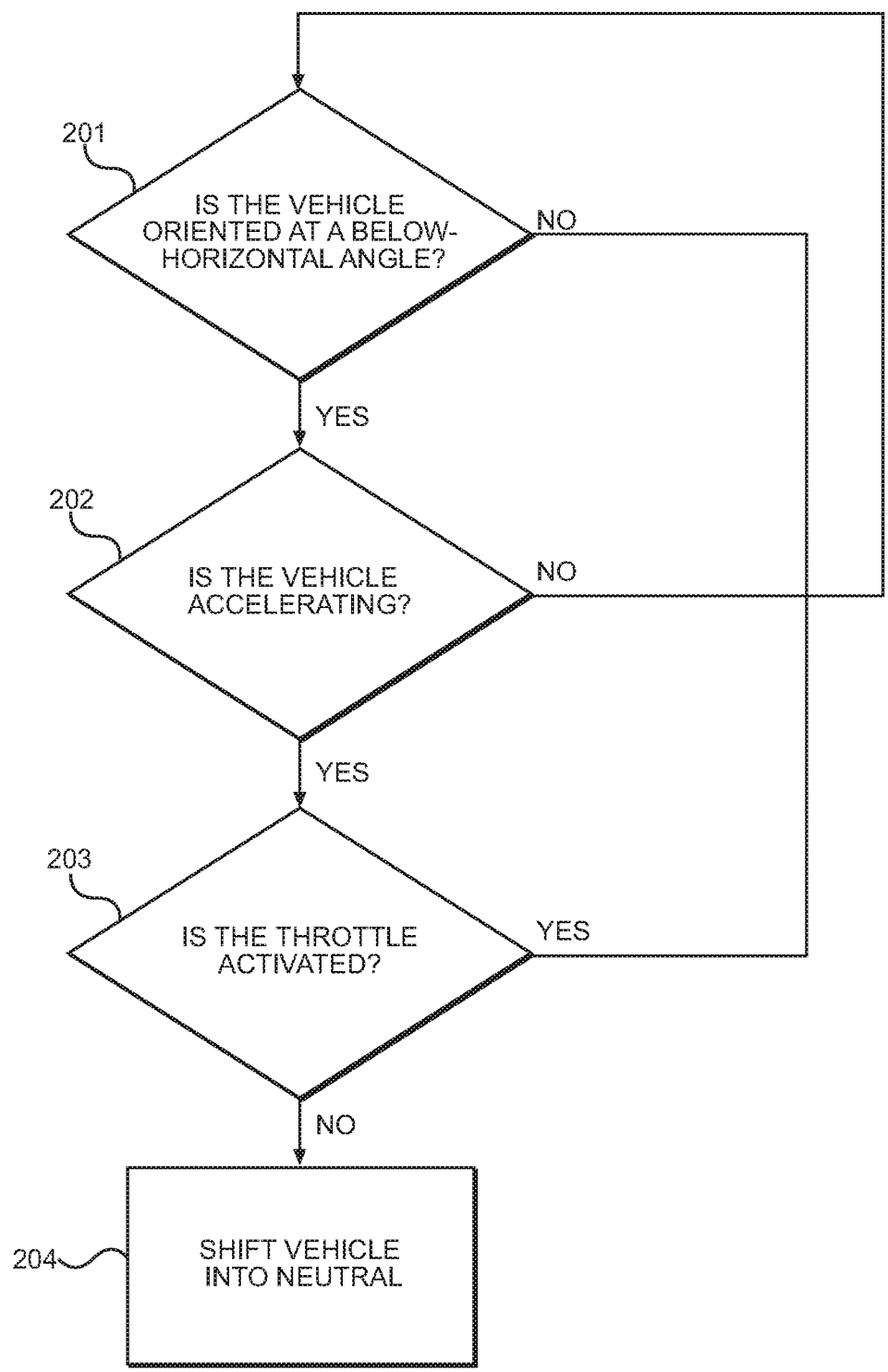
FIG. 2A shows a flowchart of an algorithm of a method for automatically shifting a vehicle into neutral.

Referring now to FIG. 2A, there is shown a flowchart of an algorithm of a method for automatically shifting a vehicle into neutral. In one configuration, a system embodying the disclosed method is configured to automatically shift the transmission of a vehicle into neutral based upon three separate criteria as detected by a sensor assembly of the vehicle. The method includes a step 201 of detecting whether the vehicle is oriented at a below-horizontal angle, i.e., whether the vehicle is tilted downwardly, via, e.g., a tilt sensor. If the vehicle is not oriented downwardly, then the transmission of the vehicle is not shifted. The method further includes a step 202 of detecting whether the vehicle is accelerating via, e.g., an acceleration sensor. If the vehicle is not accelerating, i.e., the vehicle is halted, decelerating, or traveling at a constant rate of speed, then the transmission of the vehicle is not shifted. The method further includes a step 203 of detecting of whether the throttle is activated. If the throttle is activated, then the transmission of the vehicle is not shifted. However, if all of the aforementioned criteria are satisfied, then the vehicle will shift into neutral at step 204.

Figure 2B:
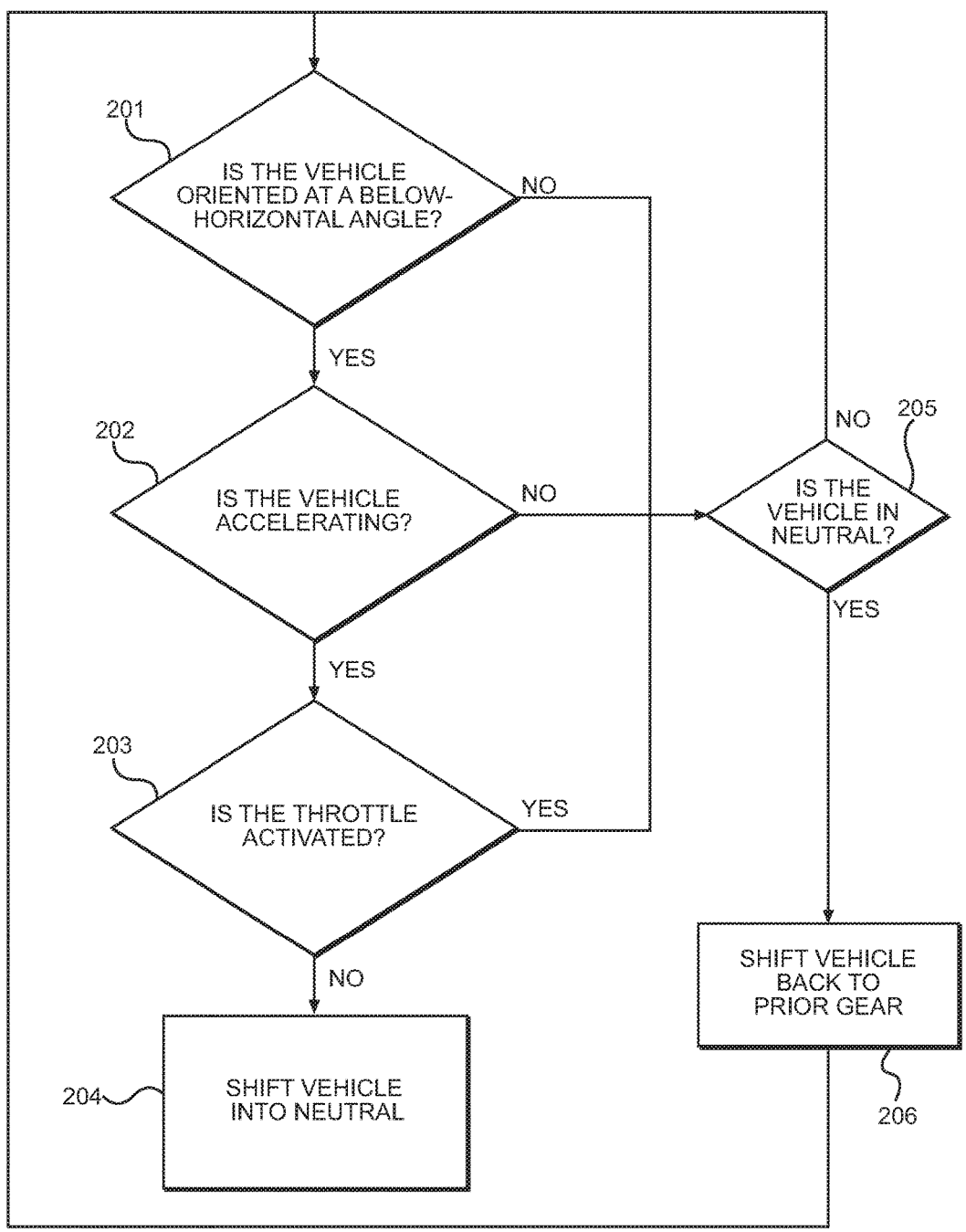
FIG. 2B shows a flowchart of an algorithm of a method for automatically shifting a vehicle to and from neutral.

Referring now to FIG. 2B, there is shown a flowchart of an algorithm of a method for automatically shifting a vehicle to and from neutral. In this embodiment of the method, the method includes additional steps as compared to the method disclosed in FIG. 2A to shift the vehicle from neutral back to the prior gear at step 206 if the monitored conditions are no longer satisfied. As with the method disclosed in FIG. 2A, the present embodiment detects the orientation of the vehicle, detects whether the vehicle is accelerating, and detects whether the throttle is activated as steps 201, 202, and 203, respectively. Likewise, if all of the conditions are satisfied, then the vehicle shifts into neutral at step 204.

The present method further includes step 205, which determines whether the vehicle is currently in neutral if any one of the conditions are not satisfied. If the vehicle is not currently in neutral, then no action need be taken. However, if the vehicle is currently in neutral, then the vehicle shifts back to the prior gear, e.g., drive, at step 206. In this embodiment, the method is executable by a vehicle system to automatically shift the vehicle in and out of neutral based upon whether all of the stated conditions are satisfied.

Applicant notes that the detection or variable-monitoring steps of the algorithms of the present system and method as depicted in FIGS. 2A and 2B are shown in a particular order. However, the provided embodiments are merely illustrative and the present system and method is not limited to a particular order.

The foregoing discussion has been presented for purposes of illustration and description. The foregoing is not intended to limit the disclosure to the form or forms disclosed herein. The features of the embodiments or configurations of the disclosure may be combined in alternate embodiments or configurations other than those discussed above and various embodiments or configurations can be modified with features from other embodiments or configurations, i.e., the various features of the disclosure are grouped in embodiments or configurations in the interests or economy. This method of disclosure is not to be interpreted as reflecting an intention that the claims require more features than are expressly recited in each claim. Moreover, other variations, combinations, and modifications are within the scope of the disclosure, e.g., as may be within the skill and knowledge of those in the art, after understanding the present disclosure.

I claim:

1. A system of a vehicle, comprising:
a tilt sensor configured to detect a tilt of the vehicle;

an acceleration sensor configured to detect an acceleration of the vehicle;
a throttle sensor configured to detect a state of a throttle of the vehicle;
a logic that, when executed at least in part by a processor, causes the system to perform a method, the method comprising:
detecting the tilt of the vehicle;
detecting the acceleration of the vehicle;
detecting the state of the throttle of the vehicle; and
shifting a transmission of the vehicle to neutral when the vehicle is tilted downwardly, the vehicle is accelerating, and the throttle is not activated.

2. The system of claim 1, wherein the method further comprises:
shifting the transmission of the vehicle from neutral to a prior gear when the vehicle is in neutral and either the vehicle is not tilted downwardly, or the vehicle is not accelerating, or the throttle is activated.

3. The system of claim 1, wherein the tilt sensor includes a tiltmeter.

4. The system of claim 1, wherein the throttle sensor is operably connected to an internal electronic throttle control of the vehicle.

5. The system of claim 1, wherein the throttle sensor includes a sensor configured to detect whether a gas pedal of the vehicle is depressed.

6. The system of claim 1, wherein the throttle sensor includes a throttle position sensor configured to detect a position of the throttle of the vehicle.

7. The system of claim 1, wherein the acceleration sensor is operably connected to an on-board speed detection system of the vehicle.

8. The system of claim 1, wherein the acceleration sensor includes an accelerometer.

9. A method of shifting a vehicle based upon criteria detected by a tilt sensor, an acceleration sensor, and a throttle sensor, comprising:
detecting a tilt of the vehicle via the tilt sensor;
detecting an acceleration of the vehicle via the acceleration sensor;
detecting a state of a throttle of the vehicle via the throttle sensor; and
shifting a transmission of the vehicle to neutral when the vehicle is tilted downwardly, the vehicle is accelerating, and the throttle is not activated.

10. The method of claim 9, further comprising:
shifting the transmission of the vehicle from neutral to a prior gear when the vehicle is in neutral and either the vehicle is not tilted downwardly, or the vehicle is not accelerating, or the throttle is activated.

11. The system of claim 9, wherein the tilt sensor includes a tiltmeter.

12. The system of claim 9, wherein the throttle sensor is operably connected to an internal electronic throttle control of the vehicle.

13. The system of claim 9, wherein the throttle sensor includes a sensor configured to detect whether a gas pedal of the vehicle is depressed.

14. The system of claim 9, wherein the throttle sensor includes a throttle position sensor configured to detect a position of the throttle of the vehicle.

15. The system of claim 9, wherein the acceleration sensor is operably connected to an on-board speed detection system of the vehicle.

16. The system of claim 9, wherein the acceleration sensor includes an accelerometer.

* * * * *